United States Patent [19]
Jennings

[11] Patent Number: 5,934,429
[45] Date of Patent: *Aug. 10, 1999

[54] AUTOMATICALLY ADJUSTING FRICTION CLUTCH WITH CAM LOCATING FINGERS

[75] Inventor: Mark Jennings, Auburn, Ind.

[73] Assignee: Eaton Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/748,702

[22] Filed: Nov. 13, 1996

[51] Int. Cl.$^6$ ........................................................ F16D 13/75
[52] U.S. Cl. ..................................... 192/70.25; 192/111 A
[58] Field of Search ............................. 192/70.25, 111 A, 192/109 R

[56] References Cited

U.S. PATENT DOCUMENTS

| | | |
|---|---|---|
| 4,191,285 | 3/1980 | Thelander, Sr. et al. . |
| 4,207,972 | 6/1980 | Zeidler ................................. 192/111 A |
| 4,228,883 | 10/1980 | Palmer ................................. 192/111 A |
| 5,069,322 | 12/1991 | Mizukami et al. . |
| 5,377,803 | 1/1995 | Link et al. ........................ 192/70.25 X |
| 5,404,979 | 4/1995 | Craft et al. ............................. 192/70.25 |
| 5,419,418 | 5/1995 | Uenohara et al. . |
| 5,450,934 | 9/1995 | Maucher ............................... 192/70.25 |
| 5,494,143 | 2/1996 | Simmonds . |
| 5,513,735 | 5/1996 | Uenohara ............................. 192/111 A |
| 5,560,463 | 10/1996 | Link et al. ............................ 192/70.25 |
| 5,645,154 | 7/1997 | Weidinger ............................. 192/70.25 |
| 5,690,203 | 11/1997 | Link et al. ............................ 192/70.25 |

*Primary Examiner*—Charles A Marmor
*Assistant Examiner*—Scott Lund
*Attorney, Agent, or Firm*—Dykema Gossett PLLC

[57] ABSTRACT

An adjustment mechanism for a frictional clutch for a motor vehicle includes a stationary annular cam, a rotating annular cam, a cam spring, an axially oriented friction pin, and a cam location finger. The stationary annular cam is centered about an axis of rotation and is rotatably fixed relative to a clutch pressure plate. The stationary annular cam has a plurality of cam surfaces. The rotating annular cam is also centered about the axis of rotation and is rotatable relative to the stationary annular cam. The rotating annular cam has a plurality of cam surfaces which engage the cam surfaces of the stationary annular cam. The engaged cams are configured for placement between the pressure plate and the biasing member. The stationary annular cam and the rotating annular cam together define an effective thickness of the pressure plate with the effective thickness increasing with relative rotation between the pressure plate and the rotating annular cam in a first direction and decreasing with relative rotation in a second direction. The cam spring is disposed between the stationary annular cam and the rotating annular cam and induces relative rotation between the two in the first direction. The axially oriented friction pin is sized to be press fit into an aperture in the pressure plate. The pin has a first end and a second end. The cam location finger has a first end engaging a one of the cams closest to the biasing member. The cam location finger has a second end engaging the friction pin. The cam location fingers limit the effective thickness of the pressure plate.

4 Claims, 3 Drawing Sheets

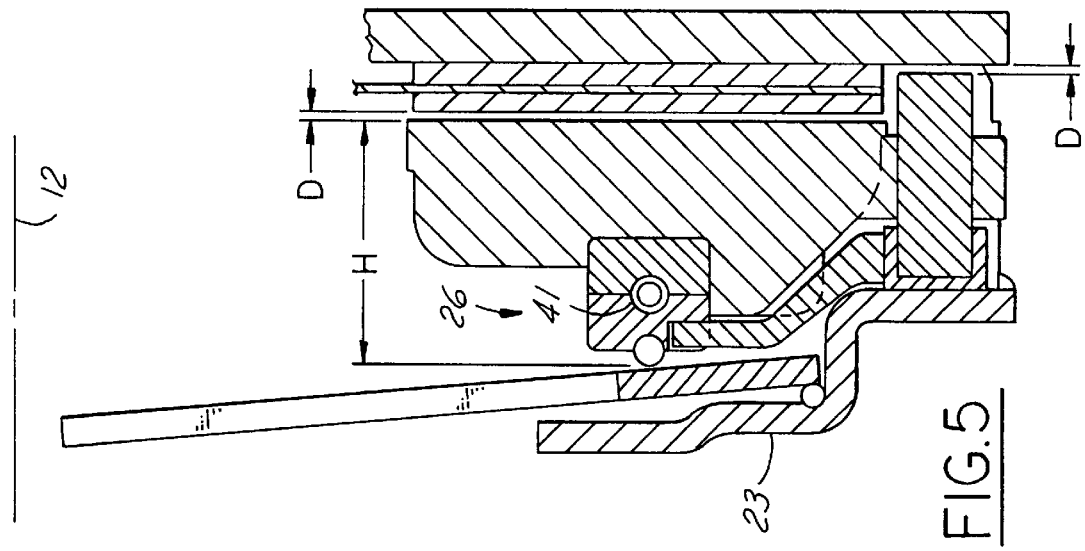
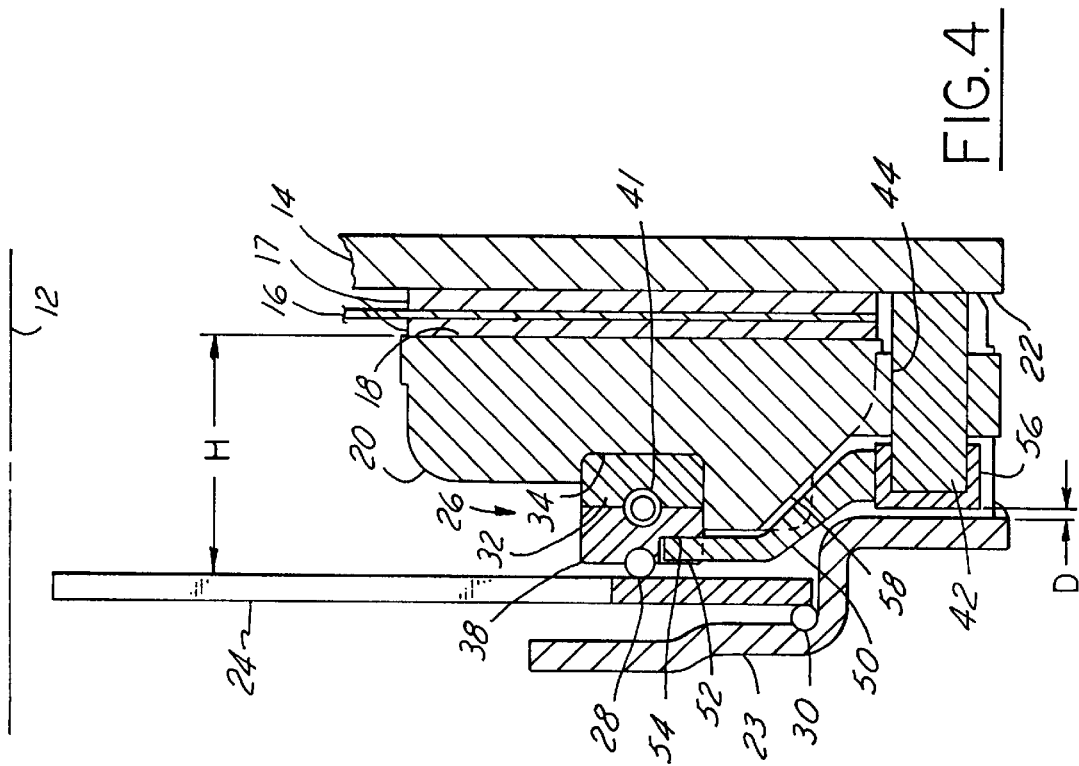

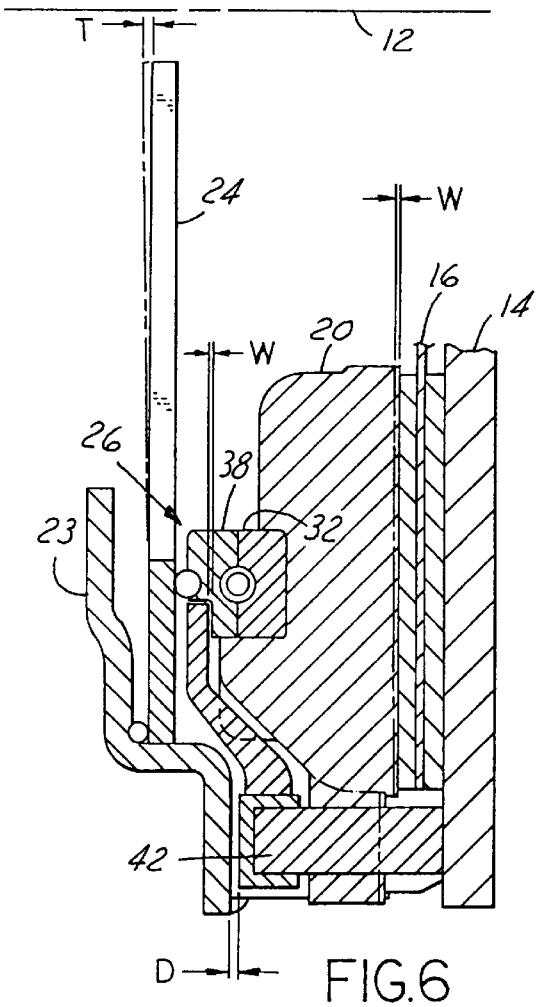
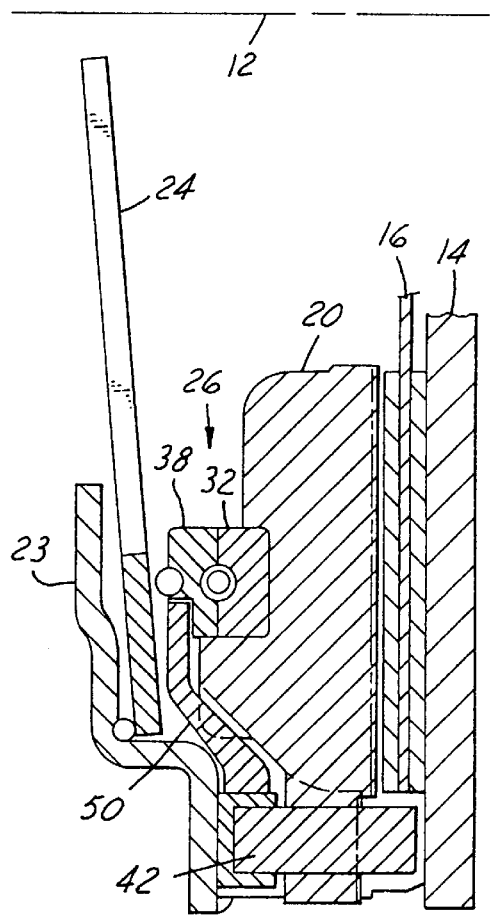
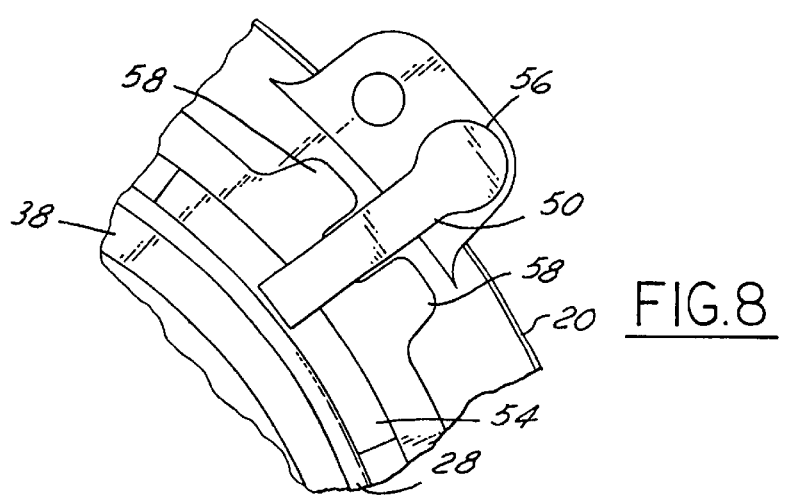

AUTOMATICALLY ADJUSTING FRICTION CLUTCH WITH CAM LOCATING FINGERS

FIELD OF THE INVENTION

This invention relates to the field of friction clutches, and more particularly to friction clutches having automatic adjustment mechanisms.

BACKGROUND OF THE INVENTION

Known friction clutches providing a releasable torsional connection between a motor vehicle engine flywheel and an associated transmission require adjustment of the pressure clutch plate's released position relative to the flywheel to insure that complete engagement of the friction clutch can be achieved after the friction material of the clutch driven disc begins to wear. Some clutches are provided with automatic adjustment mechanisms which are disposed between the pressure plate and an associated biasing member. The clutch engagement force provided by the biasing member in the engaged condition prevents adjustment of the adjustment mechanism. However, when the clutch is released, engine torsional vibrations may cause excessive adjustment of the clutch.

It is therefore desired to provide an adjustment limiting device for automatic adjustment mechanisms.

SUMMARY OF THE INVENTION

An adjustment mechanism for a frictional clutch for a motor vehicle includes a stationary annular cam, a rotating annular cam, a cam spring, an axially oriented friction pin, and a cam location finger. The stationary annular cam is centered about an axis of rotation and is rotatably fixed relative to a clutch pressure plate. The stationary annular cam has a plurality of cam surfaces. The rotating annular cam is also centered about the axis of rotation and is rotatable relative to the stationary annular cam. The rotating annular cam has a plurality of cam surfaces which engage the cam surfaces of the stationary annular cam. The engaged cams are configured for placement between the pressure plate and the biasing member. The stationary annular cam and the rotating annular cam together define an effective thickness of the pressure plate with the effective thickness increasing with relative rotation between the pressure plate and the rotating annular cam in a first direction and decreasing with relative rotation in a second direction. The cam spring is disposed between the stationary annular cam and the rotating annular cam and induces relative rotation between the two cams in the first direction. The axially oriented friction pin is sized to be press fit into an aperture in the pressure plate. The pin has a first end and a second end. The cam location finger has a first end engaging a one of the cams closest to the biasing member. The cam location finger has a second end engaging the friction pin. The cam location finger limits the effective thickness of the pressure plate.

A frictional clutch for a motor vehicle includes a cover, a pressure plate, a biasing member, a stationary annular cam, a rotating annular cam, a cam spring, an axially oriented friction pin, and a cam location finger. The pressure plate is coupled to the cover for rotation therewith about an axis and has a frictional engagement surface substantially normal to the axis. The biasing member is interposed between the cover and the pressure plate and is selectively moveable between engaged and disengaged positions. The biasing member operably biases the pressure plate to an engaged position. The stationary annular cam is centered about the axis and is rotatably fixed relative to the pressure plate and has a plurality of cam surfaces. The rotating annular cam is centered about the axis and is rotatable relative to the pressure plate. The rotating annular cam has a plurality of cam surfaces which engage the cam surfaces of the stationary annular cam. The engaged cams are axially disposed between the pressure plate and the biasing member. The engaged cams define an effective thickness of the pressure plate extending from the frictional engagement surface to an engagement feature of a one of the cams closest to the biasing member. The effective thickness of the pressure plate increases with relative rotation between the cams in a first direction and decreases with relative rotation in a second direction. The cam spring is disposed between the cams and induces relative rotation therebetween in the first direction. The axially oriented friction pin is press fit into an aperture in the pressure plate and has a first end and a second end. The first end extends beyond the fictional engagement surface. The cam location finger has a first end engaging the one of the cams closest to the biasing member and also has a second end engaging the friction pin. The cam location finger limits the effective thickness of the pressure plate.

It is thus readily apparent that the disclosed clutch provides an adjustment limiting mechanism for automatic adjustment mechanisms.

BRIEF DESCRIPTION OF THE DRAWINGS

FIG. 4 is a sectional view in the direction of arrows 4 of FIG. 1 with the clutch engaged and evidencing no wear of the driven disc.

FIG. 5 is a view of the clutch in FIG. 4 in the released condition.

FIG. 6 is a view of the clutch in FIG. 4 in the engaged condition evidencing wear of the driven disc.

FIG. 7 is the clutch of FIG. 6 in the released position and also evidencing wear of the driven disc.

FIG. 8 is a broken out portion of FIG. 1 in circle 3 showing an alternative embodiment.

DESCRIPTION OF PREFERRED EMBODIMENTS

Figure 1:
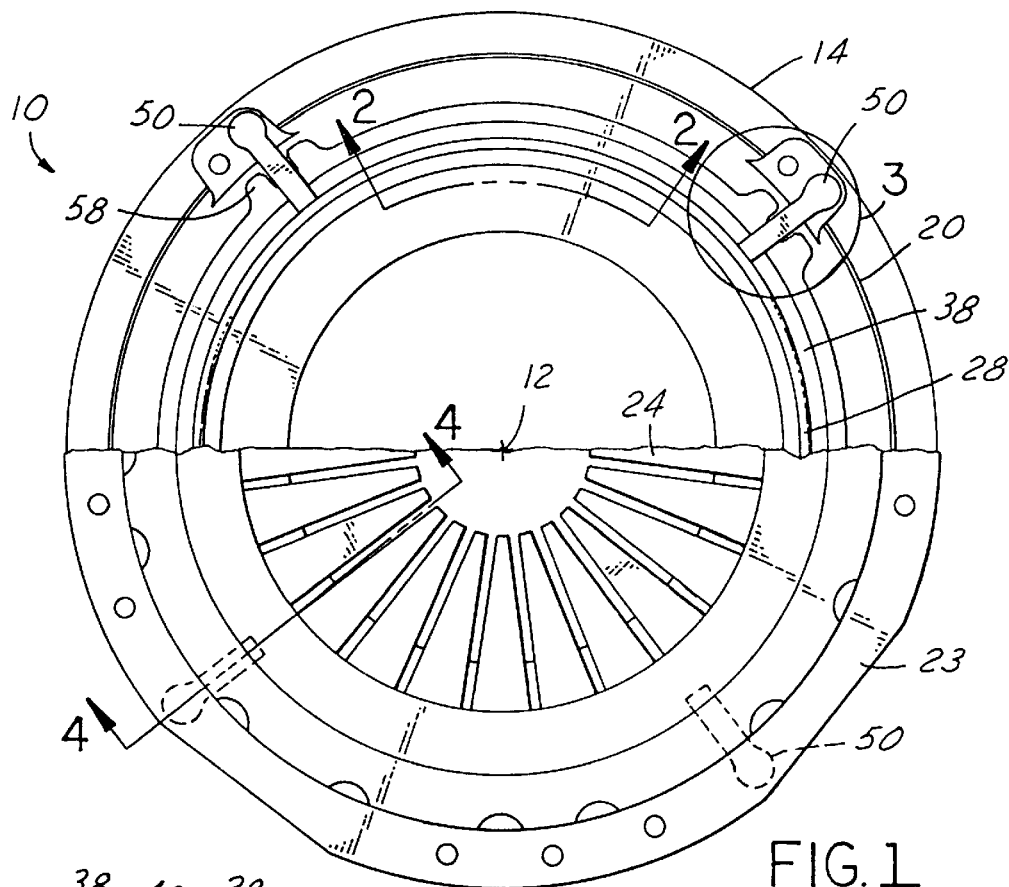
FIG. 1 is an end view of a clutch with its cover and diaphragm spring partially broken away to show an adjustment mechanism.

A frictional clutch 10 for a motor vehicle is shown in FIG. 1. Clutch 10 rotates about axis 12. A flywheel 14, shown in FIG. 4, is rotatably fixed to an output shaft of a motor vehicle engine (not shown). A driven disc 16, centered with respect to axis 12, has a hub (not shown) which engages an input shaft of a motor vehicle transmission (not shown). A friction element 17 of driven disc 16 is engaged by an engagement surface 18 of pressure plate 20 on one side and by an engagement surface 22 of flywheel 14 on the other side.

A cover 23, shown partially broken away in FIG. 1, is disposed over pressure plate 20 and is fixed to flywheel 14 as is best shown in FIGS. 4–7. A diaphragm spring 24, serving as a biasing member, is disposed between cover 23 and pressure plate 20, and forces pressure plate 20 against driven disc 16 which in turn is pressed against flywheel engagement surface 22 in an engaged condition. A potential alternative to diaphragm spring 20 is a plurality of clutch levers disposed between cover 23 and pressure plate 20, with coil springs acting against the levers to bias pressure plate 20 toward flywheel 14.

Diaphragm spring 24 engages cover 23 and an automatic adjustment mechanism 26 indirectly. Spring 24 contacts a first or outer diameter pivot ring 30 inside cover 23 and a second or inner diameter pivot ring 28 centered over automatic adjustment mechanism 26. Automatic adjustment mechanism 26 is disposed between pressure plate 20 and diaphragm spring 24.

Figure 2:
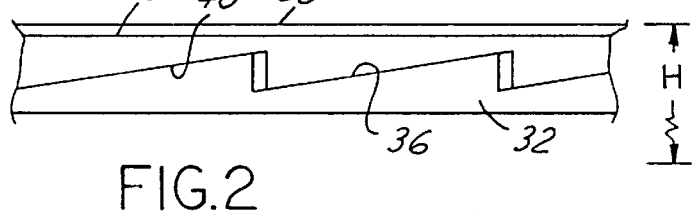
FIG. 2 is a broken out view of the cams in the direction of arrows 2 of FIG. 1.

Adjustment mechanism 26 includes a rotating annular cam 32 disposed within a cam groove 34 in pressure plate 20. Rotating annular cam 32 is concentric with axis 12. Cam 32 has a plurality of cam surfaces 36 on a side opposite cam groove 34. A stationary annular cam 38 is disposed over rotating annular cam 32, and has a plurality of cam surfaces 40 in engagement with the indexing or rotating cam surfaces 36 as best seen in FIG. 2. Second pivot ring 28 is disposed in a groove in stationary annular cam 38 on a side opposite cam surfaces 40. A cam spring 41 is disposed between rotating annular cam 32 and stationary annular cam 38, biasing the cams in a direction tending to increase an effective pressure plate thickness H as shown in FIGS. 4 and 2.

A plurality of friction pins 42, four in the present embodiment, are distributed around an outer circumference of pressure plate 20. Friction pins 42 are press fit into axially oriented pin apertures 44 evenly distributed around an outer circumference of pressure plate 20. Pins 42 are disposed in an axial gap between cover 23 and flywheel engagement surface 22. Pins 42 are of a length shorter than the axial gap. A first end of each of friction pins 42 contacts engagement surface 22 of flywheel 14 when the clutch is engaged. The interference fit between pins 42 and apertures 44 is selected to resist movement of pins 42 within apertures 44 if the cumulative load on the pins 42 is less than or equal to the maximum expected load pressure plate release load. Pins 42 will slide in apertures 44 when the pressure plate is subjected to the clutch apply load induced by diaphragm spring 24 or an equivalent biasing member.

Figure 3:
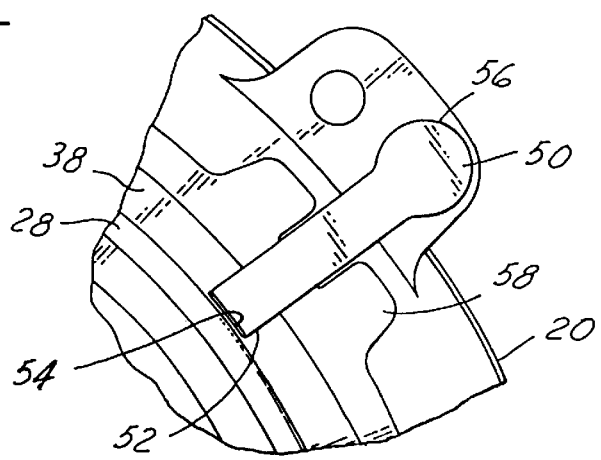
FIG. 3 is an enlarged, broken out portion of FIG. 1 in circle 3.

Cam locating fingers 50 extend from a second end of friction pins 42 to stationary annular cam 38. Cam locating fingers 50 each have a first end 52 disposed in a finger notch 54 of stationary annular cam 38. Cam locating fingers 50 also have a second end with a pin cap 56 disposed over a second end of friction pin 42. When the clutch is fully released, and diaphragm spring 24 unseats from ring 28, pin caps 56 are squeezed between the second ends of pins 42 and the cover. The first ends 52 of fingers 50 are resultantly consistently positioned relative to cover 23 and flywheel 14 and define departure gap D between the ends of pins 42 and engagement surface 22. The desired consistent positioning can be alternatively achieved by fixing fingers 50 to pins 42 in some other fashion or by forming fingers 50 integral with pins 42. Engagement between first end 52 and notch 54 prevents rotation of cam 38. As best shown in FIG. 3, first end 52 is substantially equal to a width of notch 54. It is this relative lack of lash that prevents the rotation of cam 38

It should be appreciated that when the clutch is released and the departure of pins 42 from engagement surface 22 is less than D, adjustment will not occur.

Positioning lugs 58 are formed on pressure plate 20 and define anti-rotation surfaces which trap fingers 50 on their sides to prevent any pivoting or rotation of them. Alternatively, slots could be milled in the pressure plate 20 to provide the desired retention of fingers 50.

The invention operates in the following manner. In a no-wear condition, as shown in FIGS. 4 and 5, friction pins 42 are at their original position relative to pressure plate 20. With clutch 10 engaged, the first end of friction pin 42 is in contact with flywheel engagement surface 22. Effective thickness H of pressure plate 20 provided by adjustment mechanism 26 is at its minimum. First end 52 of finger 50 is in contact with the surface of finger notch 54. The load applied by diaphragm spring 24 against pressure plate 20 through adjustment mechanism 26 maintains the relative rotative position of cam surfaces 36 and 40. The distance between cover 23 and pin cap 56 equals departure gap D. As clutch 10 is released by displacing diaphragm spring 24 as shown in FIG. 5, pressure plate 20 is biased away from flywheel 14 and toward cover 23 by an anti-rotation strap (not shown) or some other means. Departure gap D is transferred to the distance between engagement surface 22 and the first end of pin 42. If driven disc 16 is biased toward engagement surface 22, and is considered essentially incompressible, the distance between pressure plate engagement surface 18 and driven disc friction element 17 is also equal to departure gap D. Because of the interference fit between pin 42 and aperture 44, when pin cap 56 engages cover 23, travel of pressure plate 20 toward cover 23 is terminated. When diaphragm spring 24 unseats from pivot ring 28, the force preventing adjustment or indexing of cams 32 and 38 is eliminated. However, indexing of rotating annular cam 32 relative to stationary annular cam 38 is prevented by the engagement of first end 52 against the surface of notch 54.

FIG. 6 shows a clutch in an engaged position after it has experienced some wear of friction element 17, but without any adjustment of the effective thickness H by adjustment mechanism 26, as would be expected after a number of clutch engage/disengage cycles where diaphragm spring 24 never completely unseated from adjustment mechanism 26. The wear of friction element 17 and the associated decreased thickness of driven disc 16 causes pressure plate 20 to be forced closer to flywheel engagement surface 22 by diaphragm spring 24. Friction pins 42 slide in pin apertures 44 responsive to the clutch engagement force of diaphragm spring 24, causing pressure plate 20 to move closer to flywheel engagement surface. Pressure plate 20 is displaced from its original position relative to pins 42, shown in phantom, to a second position closer to the flywheel engagement surface 22 and shown in solid lines. Since no adjustment of adjustment mechanism 26 has occurred, a gap W equal to the amount of wear will be present between first end 52 of finger 50 and the surface of finger notch 54.

When the clutch is released, as shown in FIG. 7, pressure plate 20 is again biased away from driven disc 16, with friction pin 42 and pin cap 56 limiting travel of pressure plate 20 to departure distance D. However, as the axial load induced by diaphragm spring 24 is removed from second pivot ring 30, cam spring 41 is able to bias rotating annular cam 32 relative to pressure plate 20 and stationary annular cam 38 to increase effective pressure plate thickness H until first ends 52 of fingers 50 again engage the surface of finger notch 54, preventing further adjustment. When clutch 10 is reengaged after this adjustment, diaphragm spring 24 engages second pivot ring 28 at the same location engagement would occur with an unworn clutch, thereby restoring the original apply force of diaphragm spring 24 against pressure plate 20.

It should be appreciated that there are readily apparent alternative embodiments of the above-described clutch. For example, the rotating annular cam could be disposed against diaphragm spring 24 instead of in pressure plate cam groove 34, with stationary annular cam 38 being disposed in pressure plate cam groove 34, or yet alternatively, being formed integrally with pressure plate 20.

If rotating annular cam 32 is disposed most proximate to diaphragm spring 24, then finger notch 54 will be placed in rotating annular cam 32, and must therefore be widened to accommodate the rotation relative to the first end 52 of fingers 50. This is shown in FIG. 8 with notch 54 having an included angle of approximately 30°. Pressure plate finger positioning lugs 58 engage the sides of fingers 50, preventing pivoting of fingers 50.

The embodiments disclosed herein have been discussed for the purpose of familiarizing the reader with the novel aspects of the invention. Although preferred embodiments of the invention have been shown and disclosed, many changes, modifications, and substitutions may be made by one having ordinary skill in the art without necessarily departing from the spirit and scope of the invention as described in the following claims.

I claim:

1. An adjustment mechanism for a friction clutch for a motor vehicle comprising:

a pressure plate having an axis of rotation;

a stationary annular cam centered about the axis of rotation and having a plurality of notches therein, and the stationary annular cam being rotatably fixed relative to the pressure plate and having a plurality of cam surfaces;

a rotating annular cam centered about the axis and rotatable relative to the stationary annular cam and having a plurality of cam surfaces engaging the cam surfaces of the stationary annular cam, and the rotating annular cam and the stationary annular cam being configured for placement between the pressure plate and a biasing member, with the rotating annular cam being axially disposed between the stationary annular cam and the pressure plate, wherein the cams define an effective thickness of the pressure plate, with the effective thickness increasing with relative rotation between the cams in a first direction and decreasing with relative rotation in a second direction;

a cam spring disposed between the cams inducing relative rotation therebetween in the first direction;

a plurality of axially oriented friction pins sized to be press fit into apertures in the pressure plate and the friction pins each having a first end and a second end;

a plurality of cam location fingers, each cam location finger having a first end disposed in one of the notches of the stationary annular cam and each cam location finger having a second end engaging the second end of one of the friction pins wherein each cam location finger limits the effective thickness; and a plurality of pairs of finger anti-rotation features formed unitarily with the pressure plate with one of each pair of finger anti-rotation features being disposed on opposite sides of each cam location finger and the finger anti-rotation features being in operable engagement with the cam location fingers, and a plurality of stationary cam anti-rotation features defined by engagement between the notches in the stationary annular cam and the first ends of each of the cam location fingers wherein rotation of the stationary annular cam is prevented by engagement of the first end of each of the cam location fingers with one of the notches.

2. An automatic adjustment mechanism for a friction clutch for a motor vehicle as claimed in claim 1 wherein the pairs of finger anti-rotation features are provided by pairs of positioning lugs disposed on opposite sides of the cam location fingers.

3. A frictional clutch for a motor vehicle comprising:

a cover;

a pressure plate coupled to the cover for rotation therewith about an axis and having a frictional engagement surface substantially normal to the axis;

a biasing member interposed between the cover and the pressure plate selectively moveable between engaged and disengaged positions and operably biasing the pressure plate to an engaged position;

a stationary annular cam centered about the axis and having a plurality of notches therein and being rotatably fixed relative to the pressure plate and having a plurality of cam surfaces;

a rotating annular cam centered about the axis and rotatable relative to the pressure plate and having a plurality of cam surfaces engaging the cam surfaces of the stationary annular cam, and the rotating annular cam and the stationary annular cam being axially disposed between the pressure plate and the biasing member, with the rotating annular cam being axially disposed between the stationary annular cam and the pressure plate, wherein the cams define an effective thickness of the pressure plate from the frictional engagement surface to an engagement feature of one of the cams closest to the biasing member, with the effective thickness of the pressure plate increasing with relative rotation between the cams in a first direction and decreasing with relative rotation in a second direction;

a cam spring disposed between the stationary annular cam and the rotating annular cam inducing relative rotation therebetween in the first direction;

an axially oriented friction pin press fit into an aperture in the pressure plate having a first end and a second end with the first end extending beyond the frictional engagement surface;

a cam location finger having a first end disposed in one of the notches of the stationary annular cam and the cam location finger having a second end engaging a second end of the friction pin wherein the cam location finger limits the effective thickness of the pressure plate; and a pair of finger anti-rotation features formed on the pressure plate unitarily with the pressure plate with one of the pair of finger anti-rotation features being disposed on opposite sides of the cam location finger and the finger anti-rotation features being in operable engagement with the cam location finger, and a stationary cam anti-rotation feature defined by engagement between one of the notches in the stationary annular cam and the first end of the cam location finger wherein rotation of the stationary annular cam is prevented by engagement of the first end of the cam location finger with one of the notches.

4. A frictional clutch for a motor vehicle as claimed in claim 3 wherein the pair of finger anti-rotation features is provided by a pair of positioning lugs disposed on opposite sides of the cam location finger.

* * * * *